United States Patent [19]

Salgó et al.

[11] Patent Number: 4,565,576

[45] Date of Patent: Jan. 21, 1986

[54] PRINTING INK OF NEW TYPE AND PROCESS FOR PREPARING SAME

[75] Inventors: Vilmos Salgó; József Hanzély; Anna Baross née Sipöcz; István Geri, all of Budapest, Hungary

[73] Assignee: Budacolor Festekgyar, Budapest, Hungary

[21] Appl. No.: 437,672

[22] Filed: Oct. 29, 1982

[30] Foreign Application Priority Data

Dec. 30, 1981 [HU] Hungary ............................. 3190/81

[51] Int. Cl.$^4$ ............................................ C09D 11/02
[52] U.S. Cl. .................................. 106/23; 106/288 B; 106/288 Q; 106/308 B; 106/308 Q
[58] Field of Search ................. 106/23, 308 B, 308 Q, 106/288 B, 288 Q

[56] References Cited

U.S. PATENT DOCUMENTS 4,490,177 12/1984 Shioi et al. ............................. 106/22

FOREIGN PATENT DOCUMENTS 111364 10/1982 Japan.

Primary Examiner—Prince E. Willis
Assistant Examiner—Amelia B. Yarbrough
Attorney, Agent, or Firm—Keil & Weinkauf

[57] ABSTRACT

The invention relates to a printing ink of new type which contains pigment(s) and the usual additives, employed in the manufacturing of printing inks, dispersed in fluid vehicle phase. According to the invention the printing ink contains as pigment two pigments of differing particle size, the average particle size of one pigment being 0.1 to 0.9 μm and its amount being 3 to 27% by weight, related to the total weight of the ink, the average particle size of the other pigment being 2 to 15 μm and its amount being 4 to 37% by weight, related to the total weight of the ink. The invention concerns further a process for making this ink. The printing ink according to the invention can be used both for purposes of the textile industry and also in the graphic arts industry and makes it possible to achieve a surface improving effect on absorptive and, respectively, porous printing substrates.

5 Claims, No Drawings

PRINTING INK OF NEW TYPE AND PROCESS FOR PREPARING SAME

The invention relates to a printing ink of new type which contains pigment(s) and additives, used in the manufacturing of printing inks, dispersed in a fluid vehicle phase. The invention concerns further a process for the manufacturing of such inks.

The usual method for the manufacturing of such printing inks and pigment dispersions as applied in the graphic arts and the textile industry consists in dispersing a pigment in a vehicle corresponding to the type of the printing ink. The practical method of dispersing can be very diverse, depending on the type of the equipment used, the sort and quantity of the pigment and the sequence of addition chosen. All the known dispersion methods are, which are insoluble in the vehicle identical in that they all put the components (pigments, expanders, fillers, solid additives etc.) as a mixture into the ink system.

All these substances have to go through a dispersion process or even a succession of such processes, by the end of which they are present in the disperse system with the particle size and, resp., particle size distribution best fitting the desired application. By the end of the dispersion process there can be a slight difference in the particle size and dispersion degree of the individual solid components, the cause of this is, however, only a difference in hardness and dispergability of the substances concerned.

In the known manufacturing processes of an ink system for a certain purpose the order of magnitude of the particle size of pigments, vehicles and solid additives is being kept at the same or nearly the same value.

The order of magnitude of the particle size is nearly identical, even if the solid components of the ink are not milled in the same dispersion process, but the ink is put together out of semi-finished products, like pigment concentrates, pastes etc.

A disadvantage of the known inks is that the quality of the prints made by using them is basically defined by the substrate printed on, in the first place by the whiteness, smoothness and surface quality thereof. The traditional printing inks have no surface improving action.

The invention aims at making a printing ink which can be used both in the textile and the graphic arts industry and makes it possible to attain an improvement of the surface quality and absorptive and, resp., porous materials printed on.

The invention is based on the discovery that this aim can be fully reached at if the ink system used for printing is constituted out of two pigments of different particle size (different degree of dispersion).

A further basis of the invention is the discovery that, similarly to a two-degree vehicle system, i.e. one which consists of components of different solubility, it is also possible to constitute in the printing ink a two-degree (two-step) pigment system. The destination of the two-degree pigment system is similar to that of the two-degree vehicle system. There a part of the vehicle, here a part of the pigment(s) is being absorbed rapidly by the substrate. While, however, the goal of applying the well known two-degree vehicle system was the speeding up of the drying process and, resp., the rapid arrival at a stage free from the danger of laying off of the ink, by applying the two-degree pigment system we get new effects. Such an effect is e.g. that in comparison with the traditional disperse systems a higher colour intensity, a covering of the substrate colour and of the irregularities of the substrate surface, further a higher gloss can be arrived at.

On the basis of the facts outlined above, the invention relates to a printing ink containing pigment(s) and the usual additives, applied in printing ink manufacturing, dispersed in fluid vehicle phase, preferably in varnish. According to the invention the printing ink of new type contains pigments of two different particle sizes, the average particle size of one pigment being 0.1 to 0.9 μm, preferably 0.2 to 0.3 μm and its amount, related to the total ink weight, being 3 to 27% by weight, preferably 4 to 14 weight %, while the average particle size of the other pigment amounts to 2 to 15 μm, preferably 3 to 10 μm, and its amount, related to the total ink weight, is 4 to 37% by weight, preferably 6 to 25% by weight.

The invention relates further to a process for making the said printing ink, wherein a pigment or pigments and the usual additives of printing ink manufacturing are dispersed in fluid vehicle phase, preferably in varnish. In the sense of the invention one proceeds by taking as pigment (a) a pigment of an average particle size of 0.1 to 0.9 μm, advantageously 0.2 to 0.3 μm, in an amount, related to the total ink weight, of 3 to 27% by weight, advantageously 4 to 14% by weight, and (b) a pigment of an average particle size of 2 to 15 μm, advantageously 3 to 10 μm, in an amount, related to the total ink weight, of 4 to 37% by weight, advantageously 6 to 25% by weight.

Thus, according to the invention a pigment of a particle size larger than 1 μm and another of a particle size smaller than 1 μm, are simultaneously used, conveniently in the following combinations:

| Pigment of larger ("micron") particle size | Pigment of smaller ("sub-micron") particle size |
| --- | --- |
| transparent coloured | opaque white |
| transparent coloured | opaque coloured |
| opaque coloured | opaque white |
| opaque coloured | opaque coloured |

According to the invention it is convenient to proceed as follows: in one part of the vehicle one disperses the coloured and, respectively, black pigments giving the colour effect of the ink, and in the other part of the vehicle the pigment responsible for the surface effect is dispersed. The dispersion process should be conducted in such a way that by the end the average particle size of the colour effect pigment is 3 to 10 μm and that of the pigment with the higher dispersion degree is 0.2 to 0.7 μm.

An optimal effect can be reached when the relation of the particle sizes to each other is 10:1 and the smaller particle size is narrowed to 0.2 to 0.3 μm.

According to an advantageous realization method of the process of the invention an ink system is formed in which one of the components, generally the pigment component with the smaller particle size, is a white pigment, conveniently titanium dioxide. By mixing the two sorts of pigments in a suitable relation to each other, further by a suitable choice of specific diluents and additives, ink systems suited for the most different applications can be made. The inks according to the invention can be used as offset litho, letterpress, gravure, flexo and textile printing inks, which can represent fluid or quasi-fluid systems.

The optimal quantity of the coloured pigment and of the titanium dioxide varies according to the type of the ink.

In offset litho, letterpress, gravure and flexo inks, further in pigment dispersions for the textile industry, the amount of titanium dioxide in the total ink weight can be 3 to 27%, conveniently between 4 and 14%.

The printing inks according to the invention can be most advantageously used at a low viscosity and on absorptive printing substrates.

The basic difference between the inks according to the invention and the known ones can be explained as follows.

If about 6 to 10% titanium dioxide are mixed in the traditional way to the ink systems as known up to now, e.g. to a black offset rotation ink, according to the relative amount of the white content a gray ink and, resp., a gray print is obtained. If, however, the addition of titanium dioxide is carried out according to the principle of the present invention, a darker print of a higher density is obtained, because in this case the titanium dioxide improves the surface of the printing substrate and heightens the whiteness thereof.

The traditional pigment dispersions of the textile industry are not suited for the printing on textile materials with a dark basic hue, because they do not cover the basic colour of the fabric. If, however, a printing mass is used which has been manufactured by taking a two-degree pigment concentrate according to the present invention, the colour of the printed pattern will differentiate itself from the background and possesses a high intensity.

Considering these facts, the main advantages of the invention are the following:

1. The use of ink systems according to the invention makes it possible to get, even when printing onto substrates of a lesser quality, smaller basic weight and higher absorptivity, such results as if one were using a surface-treated, improved substrate. That is, simultaneously with printing, the printing ink effects an improvement on such parts of the surface of the printing substrate with which it is getting into contact.

2. Ever growing quantities of printing substrates with a lower basic weight are being used worldwide. By applying ink systems according to the invention it becomes possible to arrive at prints of a good quality on such substrates, too, without having to resort to additional surface improving treatment.

Thus, by using these ink systems it becomes possible, partly by lessening the basic weight, partly by improving the quality of the prints, to achieve an important economic effect.

3. According to the process of the invention printing inks for letterpress, offset litho, illustration and packaging gravure and flexo printing can be made, and with these inks it is equally possible to print onto untreated, surface-treated or coated (art) papers.

4. The textile printing inks according to the invention are suited to obtain by the way of direct pigment printing on fabrics of a medium to dark background hue patterns with a good distinction from the basic colour, high intensity and good covering. This makes it possible to manufacture new product types. Until now the patterning of such fabrics was only possible by the use of costly multi-stage technologic processes (etch printing or reserve printing).

5. By using in the printing technology the two-degree pigment dispersions of the invention, it is possible to obtain a higher colour intensity, owing to which the thickness of the ink film or the pigment concentration can be lowered. Through these savings in pigment important economic results can be obtained.

The invention is further illustrated by the aid of the following non-limiting examples.

EXAMPLE 1

PIGMENT DISPERSION FOR TEXTILE PRINTING 1.1. "Submicron" pigment concentrate 40% by weight of rutile $TiO_2$ 14% by weight of octyl-phenol-polyethylene-glycol-ether 0.4% by weight of methyl cellulose 3% by weight of Synthacryl VSC 75/1 (Hoechst AG, Werk Albert, Wiesbaden, FRG)

32% by weight of water

The mixture is dispersed in a Frima-mill until the average particle size of the $TiO_2$ pigment reaches the domain of 0.2 to 0.6 μm. Dispersion time: 3–4 hours.

Then the mixture of

4% by weight of an anionic surface active substance (EVIVUL) (Egyesült Vegyimüvek, Budapest, Hungary) and 6.6% by weight of water are added and the dispersion process is continued for further 30 minutes.

1.2. "Micron" pigment concentrate

36% by weight of Pigment Blue 15/3 (C.I. 74,160)

12% by weight of octyl-phenol-polyethylene-glycol-ether 0.2% by weight of methyl cellulose 5% by weight of Synthacryl VSC 75/1 (Hoechst AG, Werk Albert, Wiesbaden, FRG)

0.2% by weight of antifoam-substance (Polimekon 1488, Goldschmidt GmbH, Austria)

3% by weight of anionic surface active substance (EVIVUL, EVM, Buadpest) and 43.6% by weight of water.

The mixture is dispersed in a pearl mill until arriving at a particle size of 3 to 6 μm.

1.3. Two-degree pigment dispersion for textile printing

The mixture of

66% by weight of submicron pigment concentrate as under 1.1 and of

34% by weight of micron pigment concentrate as under 1.2 is mixed in a closed rapid mixer until reaching homogeneity.

Using this two-degree pigment concentrate a printing mass of e.g. following composition can be made:

1.4. Printing mass for textile printing, containing a two-degree pigment dispersion 30% by weight of two-degree pigment concentrate as under 1.3 and 70% by weight of condensing system, rich in petrol, poor in petrol or free of petrol, and containing all the components corresponding to the system: vehicle(s), viscosity controlling components, catalyst, antifoam agent etc. which are necessary to fulfil the requirements made towards the printing mass and the printed result.

The printing masses manufactured in this way can be advantageously used for the pigment printing of textile fabrics.

If one wishes to obtain a lesser depth of colour, it is convenient to diminish the quantity of the pigment dispersion as under 1.3 and to give a higher dosage of submicron pigment concentrate as under 1.1 to the printing mass. In order to strengthen to colour depth (intensity), more pigment concentrate as under 1.2 should be added.

If the thus-made printing masses are used to achieve a pattern by direct pigment printing on fabrics, which have previously been dyed by a direct method, reactive method or by a method which develops the colour on the fibres, the original dark background colour of the fabric will be covered by the printed pattern, the colouring of the print will be lively and differentiate itself well from the background.

COUNTEREXAMPLE TO EXAMPLE 1

Printing Mass for Textiles Containing Traditional Pigment Dispersion

The mixture of
10% by weight of pigment concentrate as under 1.2 and
90% by weight of condensing system, rich in petrol, poor in petrol or free of petrol
is homogenized.

The thus-obtained pigment printing masses of traditional composition are not suited for the printing onto fabrics of a dark background colour, because the basic colour will shine through the printed surface, thus causing a loss of hue and intensity of the decorating colour.

EXAMPLE 2

GRAVURE INKS WITH SURFACE IMPROVING EFFECT

With printing inks of a fluid character which, according to the invention, can be made in many different varieties and for different applications it is possible to print onto papers of a lesser quality, which are cheaper and have a higher absorptivity, in nearly the same quality as onto a coated gravure paper of high quality. On the obtained print the colour intensity is stronger, the gloss is higher, the details are sharper than if the print had been made with an ink of suitable type but of traditional composition.

Depending on the type, gravure inks contain 4 to 15% by weight of pigment.

2.1. Vehicle of type "T":

20% by weight of Albertol KP 648 (Hoeschst AG, Werk Albert, Wiesbaden, FRG)
10% by weight of Maleinate C resin (PEVDI, Budapest)
5% by weight of Alloprene R 20 (I.C.I., Mond. Div., Runcorn, Great Britain) and
65% by weight of toluene.

2.2. Submicron pigment concentrate (a) 30% by weight of rutile TiO$_2$ and 70% by weight of vehicle of type "T" as under 2.1 or
(b) 30% by weight of Permanentgelb DHG 01 (Hoechst AG, Frankfurt/M., FRG) (Pigment Yellow 12, CI 21,090) and 70% by weight of vehicle of type "T" as under 2.1.

The pigments are dispersed in a ball mill, in a pearl mill of good effectivity or in a "Frima" mill until reaching the necessary particle size range of 0.2 to 0.6 $\mu$m.

2.3. Yellow Micron Pigment Concentrate

20% by weight of Permanentgelb DHG 25 (Hoechst AG, Frankfurt/M., FRG) (Pigment Yellow 12, CI 21,090) and
80% by weight of vehicle of type "T" as under 2.1.

The pigment is dispersed in a pearl mill until reaching an average particle size of under 10 $\mu$m.

2.4. Two-degree yellow gravure ink

10% by weight of submicron pigment concentrate (variety a/ or b/ as under 2.2)
40% by weight of yellow micron pigment concentrate
45% by weight of vehicle "T" as under 2.1 and
5% by weight of toluene.

The mixture is to be processed in a closed rapid mixer until reaching homogeneity.

With the thus-made gravure ink prints can be made on paper printing substrates of a lesser quality, lower basic weight and higher absorptivity in nearly identical quality as when one would print onto coated paper.

Compared with traditional printing inks, the gloss, colour intensity and smoothness of the printed surface are better.

EXAMPLE 3

Two-Degree Printing Inks for Flexographic Printing, Packaging Gravure and with a Fluid Flexo-Character One proceeds as described in Example 2, Points 2.1 to 2.4 with the difference that the quantitative share of the pigments is changed slightly to suit the character of the ink, and instead of vehicle "T" as under 2.1 one of the well-known vehicles A, B, C, W, E, D or one of the special vehicles similar to these is taken (see e.g. in H. J. Wolfe: "Printing and Litho Inks", 6th ed., New York, 1967, p. 332).

The thus-made special gravure and flexo inks possess the same advantages as the gravure inks of Example 2.

EXAMPLE 4

OFFSET ROTATION INK OF TWO-DEGREES 4.1. Vehicle (varnish) for rotative ink

A mixture of
40% by weight of modified conifer resin (Budaresit G 130) (PEVDI, Budapest)
44% by weight of aliphatic hydrocarbon distillate (Budasolv 6/9, MAFKI, Veszprém)
8% by weight of linseed varnish oil and
8% by weight of Alsynol PN 53 (Synres BV, Hoek, Holland)
is heated to 180° C. in a heatable reactor and continuously agitated until full dissolution, then cooled to room temperature.

4.2. Submicron pigment concentrate

30% by weight of rutile TiO$_2$ and
70% by weight of rotative varnish as under 4.1.

After mixing, the titanium dioxide is to be dispersed in a pearl mill until reaching an average particle size of 0.2 to 0.6 $\mu$m.

4.3. Micron pigment concentrate

30% by weight of Permanent-Lackrot LCLL (CI 15,585) and

70% by weight of rotative varnish as under 4.1.

After mixing, the pigment is to be dispersed until reaching the average particle size of 5 to 12 μm.

4.4. Two-degree offset rotation ink

60% by weight of micron pigment concentrate as under 4.3.

20% by weight submicron pigment concentrate as under 4.2 and

20% by weight of rotative varnish as under 4.1.

After mixing the components are homogenized in a rapid mixer, then the ink obtained is filtered on a single roll mill.

The thus-obtained offset litho ink of low viscosity can be advantageously used mainly for printing onto uncoated offset papers.

Compared with the use of traditionally made printing inks, the gloss, colour intensity, surface smoothness and detail reproduction are better.

We claim:

1. A printing ink which comprises pigment(s) dispersed in a fluid vehicle phase, wherein two pigments of different particle size are present, the average particle size of one pigment being 0.1 to 0.9 μm and its amount, related to the total ink weight, being 3 to 27% by weight, the average particle size of the other pigment being 2 to 15 μm, and its amount, related to the total ink weight, being 4 to 37% by weight.

2. A printing ink as described in claim 1 wherein the average particle size of the first pigment is from 0.2–0.3 μm.

3. A printing ink as described in claim 2 wherein the amount of said first pigment relating to the total ink weight is from 4 to 14% by weight.

4. A printing ink as described in claim 2 wherein the average particle size of the second pigment is from 3 to 10 μm.

5. A printing ink as described in claim 4 wherein the amount of said second pigment, related to the total ink weight, is from 6 to 25% by weight.

* * * * *